(12) United States Patent
Storch et al.

(10) Patent No.: US 6,458,441 B1
(45) Date of Patent: Oct. 1, 2002

(54) SUBSTRATE HAVING A SECTION WITH A PEELABLE COATING AND A SURFACE DECORATION

(75) Inventors: Dirk Storch, Köln; Hanns-Peter Müller, Odenthal; Heino Müller; Johan Kijlstra, both of Leverkusen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/541,246

(22) Filed: Apr. 3, 2000

(30) Foreign Application Priority Data

Apr. 9, 1999 (DE) .......................................... 199 16 062

(51) Int. Cl.⁷ ................................................ B32B 7/06
(52) U.S. Cl. ..................... 428/40.1; 428/40.4; 428/40.5; 428/40.9; 428/41.6; 428/42.1; 428/42.2; 428/423.1; 428/425.1; 428/425.6; 428/425.8

(58) Field of Search ................................ 428/40.1, 40.4, 428/40.5, 40.9, 41.6, 42.1, 42.2, 423.1, 425.1, 425.6, 425.8

(56) References Cited

U.S. PATENT DOCUMENTS

| 4,554,214 A | 11/1985 | Ichinomiya et al. ..... 428/423.1 |
| 5,965,195 A | 10/1999 | Müller et al. ................ 427/155 |

*Primary Examiner*—Nasser Ahmad
(74) *Attorney, Agent, or Firm*—Joseph C. Gil; Thomas W. Roy

(57) ABSTRACT

The present invention relates to a substrate with at least one section having a surface decoration and a coating between the surface and the decoration. The coating can be peeled from the surface, and is prepared from an aqueous anionic polyurethane-polyurea dispersion which are free from co-solvents.

4 Claims, No Drawings

SUBSTRATE HAVING A SECTION WITH A PEELABLE COATING AND A SURFACE DECORATION

BACKGROUND OF THE INVENTION

1. Field of the Invention

The present invention relates to a substrate having a section with a peelable coating and a surface decoration.

2. Background of the Invention

There are a multiplicity of articles in trade and commerce, in advertising and in domestic use which are temporarily provided with two-dimensional markings or decorations which have to be removed again after they have fulfilled their purpose. Markings or decorations of this type can include advertising messages, operating instructions, sales information (such as price information) or information on the properties of products. Also included are signs (such as road traffic signs), the content of which is temporarily altered, as well as signs for advertising purposes which are used temporarily on the external and internal surfaces of means of transport.

Printed adhesive films or adhesive labels, e.g. those made of polyvinylchloride (PVC) or paper and comprising a viscous adhesive film, are frequently used for purposes of this type. The removal of films such as these is not without its problems, since the viscous adhesive film often remains bonded to the surface of the marked or decorated article and can only be completely removed by the use of solvents. Moreover, changes in the surface of the marked article can occur due to solvents which are present in the adhesive film.

It is an object of the present invention to overcome these deficiencies of the prior art.

According to the present invention, it is proposed that a peelable coating be provided between the surface decoration or marking and the surface of the substrate to which the latter is applied.

SUMMARY OF THE INVENTION

The present invention relates to a substrate with at least one section having a surface decoration and a coating between the surface and the decoration. The coating can be peeled from the surface, and is prepared from an aqueous anionic polyurethane-polyurea dispersion which is free from co-solvents.

DETAILED DESCRIPTION OF THE INVENTION

Examples of suitable surfaces include glass, metal, wooden or plastic surfaces, lacquered or enamelled surfaces, paper, cardboard and leather.

Articles which have surfaces of this type and are therefore considered substrates for the present invention include window panes, mirrors, furniture, appliances, motor vehicles, road signs, advertising boards, diskettes, books, cases, etc.

Suitable coating compositions for producing the peelable coating are those which adhesively bond to the surface and which are free from organic solvents, and therefore do not attack the surface.

Coating compositions, which are particularly suitable for producing peelable coatings, are disclosed in EP-A 849,298 (corresponding to U.S. Pat. No. 5,965,195, herein incorporated by reference).

Described therein are coating compositions containing aqueous, anionic dispersions of polyurethane-polyureas, which are free from co-solvents, and the solids content of which constitutes the reaction product, at least part of which is present in salt form, of a) an NCO prepolymer formed from
  i) 20 to 60% by weight of a diisocyanate selected from aliphatic diisocyanates, cycloaliphatic diisocyanates and mixtures thereof,
  ii) 20 to 78% by weight of a macrodiol having a number-average molecular weight of 500 to 10,000 and mixtures thereof,
  iii) 2 to 12% by weight of 2,2-bis-(hydroxymethyl)-alkane-mono-carboxylic acids, preferably dimethylolpropionic acid,
  iv) 0 to 15% by weight of short-chain diols having a molecular weight of 62 to 400, and
  v) 0 to 10% by weight of monofunctional alcohols as chain regulators, having a molecular weight of 32 to 350,
b) 0 to 15% by weight of diamines having a molecular weight of 60 to 300 as chain extenders,
c) 0 to 10% by weight of chain regulators selected from monoamines, alkanolamines and ammonia,
d) 0 to 3% by weight of water, and
e) 0.1 to 10% by weight of neutralizing agents, wherein the percentages of i) to v) and a) to e) add up to 100%, provided that in the prepolymer stage a) the NCO content is adjusted to a value of 65 to 85%, preferably 75 to 80%, of the calculated NCO content.

The peelable coating can be applied by dipping, knife coating, or by pouring, spraying or brushing, with subsequent drying at 20 to 100° C., preferably 20 to 80° C., using heat or infrared light.

Aliphatic and/or cycloaliphatic diisocyanates are preferably used as component a) i) of the peelable coating, such as isophorone diisocyanate (IPDI), 4,4'-dicyclohexylmethane diisocyanate, 1-methyl-2,4-diisocyanato-cyclohexane and 1-methyl-2,6-diisocyanato-cyclohexane in any mixture ratios, as well as 1,6-hexamethylene diisocyanate and/or 1,3-cyclohexane diisocyanate. It is also possible to also use small amounts of aromatic diisocyanates, such as toluene 2,4- and 2,6-diisocyanates or 2,4'- and 4,4'-diphenylmethane diisocyanates.

Macrodiols having a number-average molecular weight of 500 to 10,000 are used as component a) ii). These are preferably polyester diols obtained by the reaction of dicarboxylic acids with diols, optionally with the aid of known esterification catalysts, preferably by condensation in the melt or azeotropic condensation at temperatures of 140–240° C.

Examples of suitable acids or anhydrides include adipic acid, succinic acid (or anhydride), maleic acid (or anhydride), sebacic acid, azelaic acids, a variety of commercially available dimeric fatty acids (in hydrogenated and non-hydrogenated form), phthalic acid (or anhydride), isophthalic acid, tetrahydrophthalic acid (or anhydride), 1,4-cyclohexane-dicarboxylic acid, and hexahydrophthalic acid (or anhydride).

Suitable diols include ethylene glycol, 1,2- and 1,3-propanediol, 1,3-and 1,4-butanediol, 1,6-hexanediol, diethylene glycol, dipropylene glycol, neopentyl glycol, or mixtures of diols of this type. Polyester diols of adipic acid, hexanediol and neopentyl glycol are preferred.

Polycarbonate diols, polycaprolactone diols, hydroxypolytetra-hydrofuranes, or hydroxypolyethers based on propylene oxide are also suitable.

Suitable polycarbonate diols are obtained, for example, by the reaction of carbonic acid derivatives, such as diphenyl carbonate or phosgene, with alcohols, preferably diols, of the aforementioned type.

The number-average molecular weight of these polyols ranges between 500 and 10,000, preferably between 700 and 4000. Macrodiols having molecular weights between 1000 and 2500 are particularly preferred.

Starting components a) iii) are preferably 2,2-bis-(hydroxy-methyl)-alkane-monocarboxylic acids having a total of 5–8 carbon atoms, i.e. compounds of general formula (I)

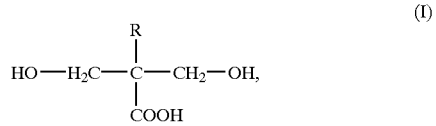

wherein R represents a radical containing 1–4 carbon atoms. 2,2-dimethylolpropionic acid is particularly preferred.

The short-chain diols having a molecular weight 62–400, which were described above, are suitable as starting component a) iv). 1,4-butanediol is particularly preferred.

Methanol, ethanol, butanol, hexanol, 2-ethylhexanol, octanol and dodecanol, and any alcohols with a molecular weight from 32 to 350, are suitable as starting component a) v).

Substances, which can be used as component b), include all aliphatic and/or cycloaliphatic compounds which contain at least two amino groups which are reactive towards isocyanates. Examples which are particularly suitable include ethylenediamine, propylenediamine, hexamethylenediamine, isophorone diamine, p-xylylene diamine, 4,4'-diaminodicyclohexylmethane and 4,4'-diamino-3,3'-dimethyidicyclo-hexylmethane.

Examples of substances which are suitable as component c) include ammonia; monofunctional amines such as methylamine, ethylamine, n-propylamine, isopropylamine, cyclohexylamine, octylamine, diethylamine and dibutylamine; and amino alcohols such as ethanolamine, diethanolamine and propanolamine.

Examples of substances which are suitable as neutralizing agents e) include ammonia, N-methylmorpholine, di-methylisopropanolamine, triethylamine, dimethylethanolamine, methyldiethanolamine, triethanolamine, morpholine, tripropylamine, ethanolamine, diethanolamine, triisopropanolamine and mixtures thereof.

In one preferred embodiment, components a) i), ii) and iii) are placed in a reactor and are reacted under anhydrous conditions within a temperature range from 50–150° C., preferably 50–110° C. The batch is thereafter cooled, acetone as well as a short-chain diol (iv) having a molecular weight 62–400 and optionally monofunctional alcohols (v) are added, and the batch is heated until the NCO content of the mixture has fallen to a value corresponding to 65 to 85% of the calculated NCO content. The NCO prepolymer is formed in this manner. Thereafter, the batch is diluted with additional acetone and is treated with the calculated amount of a mixture of a diamine and a chain terminator — dissolved in water. In this manner, 90% of the NCO groups are reacted with the chain extender, the diamine and the chain terminator. The remaining isocyanate can be reacted with the available water to form the polyurethane-polyurea used in the present invention.

The polymer synthesis reaction is preferably conducted without the use of catalysts. It is also possible, however, to employ the catalysts which are known in isocyanate chemistry (e.g. tertiary amines such as triethylamine, and tin compounds such as tin(II) octoate, dibutyltin dilaurate.

When NCO can no longer be detected (monitoring by IR), the calculated amount of neutralizing agent, preferably ammonia solution, is added to the batch, so that 50–60% of the carboxyl groups present are neutralized by the ammonia.

The desired solids concentration is obtained by the addition of water and by the subsequent removal of the acetone used. Polyurethane-polyurea dispersions which are obtained by the method according to the invention comprise 20–60% by weight solids, preferably 30–40% by weight solids, in water. Their average particle diameter is 20–1000 nm, preferably 50–500 nm.

The pH of the white polyurethane-polyurea dispersions according to the invention, which are stable during storage, is within the range from 6–9, and is preferably about 7.

After physical drying at 20–100° C., preferably 20–80° C., the polyurethane-polyurea dispersions according to the invention result in transparent, high-gloss, UV-resistant, temperature-resistant (−35 to 80° C.) coatings, which are resistant to deposits (of an organic or inorganic nature), and which on the one hand exhibit good bonding properties but on the other hand can easily be removed by peeling them off. The resistance to tearing and the extensibility of the lacquer coats are satisfactorily high.

The additives which are known from coatings chemistry, such as pigments, light stabilizers, anti-settling agents, thickeners, surface-active compounds, anti-foaming agents, etc., can be used when formulating the coating compositions.

Self-adhesive labels or adhesive films can be stuck to the peelable coatings after the latter have been applied to the surface and dried, or the peelable coatings can be decorated directly with spray paint. Moreover, they exhibit an outstanding capacity to be written on with permanent ink pens, such as those which are known as Edding'® pens or 'Lumocolor'® pens, without the permanent ink breaking through onto the surface. In order to obtain special effects, the highly transparent peelable coating can also be colored with pigments in order to obtain colored or covering peelable coating films.

If particular requirements are imposed on the resistance and durability of the surface decoration, it may be advantageous merely to provide the peelable coating under portions of the decorated surface, i.e. of the adhesive film. In particular, it may be advantageous to allow the adhesive film to protrude laterally, preferably by a few millimeters, beyond the peelable coating, so that the adhesive layer is firmly bonded to the surface in the edge region of the adhesive film.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A substrate with at least one section having a surface decoration and a coating between the surface and the decoration, wherein the coating can be peeled from the surface, and is prepared from an aqueous anionic polyurethane-polyurea dispersion which is free from co-solvents.

2. The substrate according to claim 1 wherein the surface comprises glass, metal, paper, cardboard, leather, wood, plastics, lacquer or enamel.

3. The substrate according to claim 1 wherein the surface decoration is an adhesive film, a colored coating or a permanent ink marking.

4. The substrate according to claim 1 wherein the surface decoration is an adhesive film, the edge region of which protrudes beyond the peelable coating.

* * * * *